United States Patent
Vong et al.

(10) Patent No.: US 6,645,687 B1
(45) Date of Patent: *Nov. 11, 2003

(54) IMAGING MEMBERS

(75) Inventors: Cuong Vong, Hamilton (CA); George Liebermann, Mississauga (CA); Richard A. Burt, Oakville (CA); Ah-Mee Hor, Mississauga (CA)

(73) Assignee: Xerox Corporation, Stamford, CT (US)

( * ) Notice: Subject to any disclaimer, the term of this patent is extended or adjusted under 35 U.S.C. 154(b) by 30 days.

This patent is subject to a terminal disclaimer.

(21) Appl. No.: 10/144,120

(22) Filed: May 10, 2002

(51) Int. Cl.⁷ .................... G03G 5/047; G03G 5/06
(52) U.S. Cl. ............... 430/59.4; 430/78; 430/134; 430/135
(58) Field of Search ................ 430/59.4, 78, 133, 430/134, 135

(56) References Cited

U.S. PATENT DOCUMENTS

| | | | |
|---|---|---|---|
| 4,265,990 A | 5/1981 | Stolka et al. | 430/59 |
| 5,456,998 A | 10/1995 | Burt et al. | 430/58 |
| 5,466,796 A | 11/1995 | Burt et al. | 540/139 |
| 5,472,816 A | 12/1995 | Nukada et al. | 430/78 |
| 5,493,016 A | 2/1996 | Burt et al. | 540/139 |
| 5,521,306 A | 5/1996 | Burt et al. | 540/141 |
| 5,588,991 A | 12/1996 | Hongo et al. | 117/2 |
| 6,492,080 B1 * | 12/2002 | Burt et al. | 430/59.4 |

* cited by examiner

Primary Examiner—John Goodrow
(74) Attorney, Agent, or Firm—E. O. Palazzo

(57) ABSTRACT

A process comprising forming chlorogallium phthalocyanine (ClGaPc) in N-methyl-2-pyrrolidinone (NMP) to provide a ClGaPc (NMP) Type I; separately dry milling and then wet treating the Type I product to form Type II ClGaPc (NMP); blending the ClGaPc Type II product with hydroxygallium phthalocyanine (HOGaPc) Type V and a resin to form a coating mixture; coating the resulting mixture to form a photoconductive charge generator layer.

24 Claims, No Drawings

IMAGING MEMBERS

PENDING APPLICATION AND PATENTS

Illustrated in copending application U.S. Ser. No. 09/815,116, now U.S. Pat. No. 6,492,080, the disclosure of which is totally incorporated herein by reference, is a process comprising forming a first chlorogallium phthalocyanine (ClGaPc) in N-methyl-2-pyrrolidinone (NMP) to form a ClGaPc (NMP) Type I product;

forming a second chlorogallium phthalocyanine in dimethyl sulfoxide (DMSO) to form a ClGaPc (DMSO) Type I product;

separately dry milling and then wet treating the Type I products to form respective Type II products;

blending the Type II products together along with a resin to form a coating mixture; and coating the mixture to form a photoconductive charge generator layer in an electrostatographic imaging article.

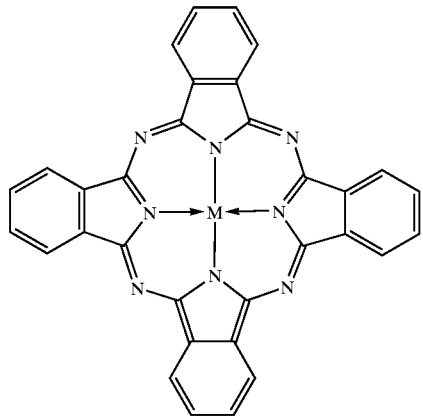

Chlorogallium Phthalocyanine, M=Ga—Cl

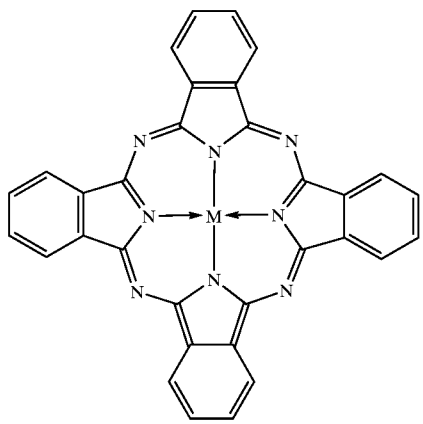

Hydroxygallium Phthalocyanine, M=Ga—OH

BACKGROUND

The present application discloses photoconductive compositions comprising gallium phthalocyanines, and more specifically, chlorogallium phthalocyanine (ClGaPc) and hydroxygallium phthalocyanine (HOGaPc) pigments. In embodiments, there are disclosed photoreceptors or photoresponsive devices, and imaging apparatus and processes thereof. More specifically, disclosed are improved photoresponsive devices comprised of a photogenerating layer and a transport layer, and processes for selecting or fine tuning the sensitivity of photoresponsive devices by including in the photogenerator layer of the device a mixture of chlorogallium phthalocyanine (ClGaPc) pigment particles, and hydroxygallium phthalocyanine (HOGaPc) pigment particles.

The photoresponsive imaging members are useful in various imaging and printing systems, including those systems wherein electrostatic latent images are formed on the imaging member. Additionally, the photoresponsive members illustrated herein can be irradiated with light, for example, as generated by a known laser to accomplish, for example, latent image formation by, for example, charged area development (CAD) or discharged area development (DAD) methodologies.

Advantages in embodiments with a mixture of pigments illustrated herein is that the article and processes thereof afford charge generator pigment compositions which can be readily varied or adjusted in photosensitivity properties while retaining excellent electrical properties; the article and processes thereof afford charge generator pigment compositions which can be readily varied or adjusted in photosensitivity properties to, for example, accommodate variations which result from manufacturing photoreceptors in different locations as may be desired, for example, for economic or other business reasons; the article and processes thereof permit charge generator pigment compositions which can be readily varied or adjusted in photosensitivity properties as desired to accommodate changes which may occur as a copier or printer machine has been modified with new or replacement electrical components that cause some shift in image quality, and the charge generator chlorogallium phthalocyanine can be prepared in the absence of a solven, such as dimethylsulfoxide (DMSO), quinoline, chloronaphthalene which possesses an odor and decomposes into toxic and very odorous compounds when heated at high temperature>100° C.

With the mixtures illustrated herein, such as a mixture of ClGaPc and HOGaPc, there is enabled a wide range of photosensitivity values from that of ClGaPc, a lower sensitivity material, to that of HOGaPc, a higher sensitivity material. The photosensitivity of HOGaPc can be about 50 percent or more than that of ClGaPc; and the photosensitivity of the blended mixture of these two pigments can be preselected primarily because of the linear dependence relationship of the composition. For the blended pigment mixtures, the plot of photosensitivity values versus the composition of pigment in terms of weight percent of either one of two pigments can evidence an excellent linear dependency with a regression coefficient $R^2$ approaching unity (the commonly used photosensitivity values are either the $E_{1/2}$, exposure energy required for 50 percent photodischarge, or the $E_{7/8}$ exposure energy required for 87.5 percent photodischarge); for the pigment mixtures illustrated herein in embodiments the $E_{1/2}$, $R^2$ is 0.985 and for $E_{7/8}$, $R^2$ is 0.964. For example, when the photosensitivity of ClGaPc is $E_{7/8}=x$ ergs/cm$^2$ and HOGaPc is $E_{7/8}=y$ ergs/cm$^2$, the final photosensitivity of a pigment mixture containing m weight percent of ClGaPc and n weight percent of HOGaPc, where the (m+n) amounts to the total pigment weight (100 percent), has a value of about $E_{7/8}=(mx+ny)$ ÷100 ergs/cm². Similarly, if $E_{1/2}$ of the ClGaPc=a ergs/cm² and HOGaPc is $E_{1/2}$=b ergs/cm² the final photosensitivity of the mixture in terms of $E_{1/2}$ can be predicted from the equation $E_{1/2}$=(ma+nb)÷100 ergs/cm². The linear range of sensitivities can be fashioned by blending varying amounts of ClGaPc with HOGaPc.

Also, the disclosed herein blend in embodiments can be used to fine tune the photosensitivity of the charge generator pigment material to a desired target value; thus the blend permits one to change the site of the photoreceptor or photoreceptor component manufacturer for economic or other business reasons, and the blend approach can be readily adapted and used to adjust the relative composition of the blended pigments to further fine tune the photosensitivity of the charge generator pigment material to certain desired values and to compensate for differences arising from other unpredictable variations in a specific manufacturing plant process. The photosensitivity adjustment can also allow a wider latitude in the manufacture of the photogenerator pigment, thus significantly reducing the cost of the pigment production process. To prepare a pigment with tight performance characteristics for only a specific device is not usually cost effective as the range of product applications is very limited, and also the expenses involved in controlling pigment process to yield narrow range of photoreceptor characteristics could become prohibitably high. The ability to adjust photoreceptor sensitivity by blending ClGaPc pigment with a HOGaPc pigment can provide a mixed pigment product with particles that possess high surface area, afford high dispersability, and have high stability against agglomeration in coating formulations and coating processes. The particles of different pigment crystals tend to repel each other hence reducing their tendency to associate to form large agglomerates which can degrade the printing resolution quality.

Numerous photoresponsive devices for electrostatographic imaging systems are known including selenium, selenium alloys, such as arsenic selenium alloys; layered inorganic photoresponsive, and layered organic devices. Examples of layered organic photoresponsive devices include those containing a charge transporting layer and a charge generating layer, or alternatively a photogenerator layer. Thus, for example, an illustrative layered organic photoresponsive device can be comprised of a conductive substrate, overcoated with a charge generator layer, which in turn is overcoated with a charge transport layer, and an optional layer overcoated on the charge transport layer. In a further variation of this device the charge transporter layer can be overcoated with a photogenerator layer. Examples of generator layers that can be employed in these devices include, for example, certain components, like selenium, cadmium sulfide, vanadyl phthalocyanine, and x-metal free phthalocyanines, dispersed in a binder resin, while examples of transport layers include dispersions of various diamines, reference for example, U.S. Pat. No. 4,265,990, the disclosure of which is incorporated herein by reference in its entirety.

There continues to be a need for photoresponsive devices, and improved imaging systems utilizing such devices. Additionally, there continues to be a need for photoresponsive devices of varying sensitivity, which devices are economical to prepare and retain their properties over extended periods of time. Furthermore there continues to be a need for photoresponsive devices that permit both normal and reverse copying of black and white and full color images, especially in high speed digital printing systems. Moreover, there is a need to provide processes for the preparation of photoresponsive members with specific photosensitivity values using pigment mixtures comprised of gallium phthalocyanines, particularly chlorogallium phthalocyanine and hydroxygallium phthalocyanine, and wherein the photodischarge characteristics of these members can be adjusted by varying the amounts of the photogenerating pigments present.

REFERENCES

In U.S. Pat. No. 5,588,991, issued Dec. 31, 1996, and U.S. Pat. No. 5,688,619, issued Nov. 18, 1997, the disclosures of which are totally incorporated herein by reference, there is disclosed a process for producing a chlorogallium phthalocyanine crystal comprising mechanically dry-grinding and converting chlorogallium phthalocyanines wherein the weight ratio of chlorogallium phthalocyanine to the grinding media can be of from 1/5 to 1/1,000.

In U.S. Pat. No. 5,521,306, issued May 28, 1996, the disclosure of which is totally incorporated herein by reference, there is disclosed a process for the preparation of Type V hydroxygallium phthalocyanine which comprises the in situ formation of an alkoxy-bridged gallium phthalocyanine dimer, hydrolyzing the alkoxy-bridged gallium phthalocyanine dimer to hydroxygallium phthalocyanine, and subsequently converting the hydroxygallium phthalocyanine product obtained to Type V hydroxygallium phthalocyanine.

In U.S. Pat. No. 5,472,816, issued Dec. 5, 1995, the disclosure of which is totally incorporated herein by reference, there is disclosed a halogen-containing hydroxygallium phthalocyanine crystal with x-ray diffraction peaks at Bragg angles (2 theta.degree.+−.0.2.degree) of (1) 7.7, 16.5, 25.1 and 26.6 degrees; (2) 7.9, 16.5, 24.4, and 27.6 degrees; (3) 7.0, 7.5, 10.5, 11.7, 12.7, 17.3, 18.1, 24.5, 26.2, and 27.1 degrees; (4) 7.5, 9.9, 12.5, 16.3, 18.6, 25.1, and 28.3 degrees; or (5) 6.8, 12.8, 15.8, and 26.0 degrees, and an electrophotographic photoreceptor containing the halogen-containing hydroxygallium phthalocyanine crystal as a charge generating material are disclosed. The hydroxygallium phthalocyanine crystals can be generated by reacting a gallium trihalide with phthalonitrile or diiminoisoindoline in a halogenated aromatic hydrocarbon solvent, treating the resulting halogenated gallium phthalocyanine with an amide solvent, and hydrolyzing the halogenated gallium phthalocyanine. The photoreceptor exhibits stabilized electrophotographic characteristics. Also of interest are U.S. Pat. Nos. 5,493,016; 5,456,998, and 5,466,796.

The disclosures of each the above mentioned patents are totally incorporated herein by reference in their entireties. The appropriate components and processes of these patents may be selected for the members disclosed herein in embodiments thereof.

In the devices, imaging apparatuses, and processes of the noted prior art, various problems may exist it is believed. For example, in the manufacture of charge generator compounds for xerography, it is a practice to reproduce a pigment synthetic procedure consistently each time the process is used to provide a consistent target charge generator compound material and thereby provide the photosensitivity values demanded by the specifications of a particular printer or copier model. It is known that the synthesis conditions employed, including the solvent used, among other factors, can function in a irreversible manner with regard to imparting to the charge generator compound so formed certain indelible electrical characteristics which can only moderately be manipulated by subsequent processing. The photoreceptor fabrication conditions, including the particular plant or plants in which manufacturing is accomplished, can cause variations in the photoreceptor's performance in printer and copier products. Image quality problems can also arise for particular machines and devices which machines may then require changes in photoreceptor charge generator specifications, or a need to adjust the sensitivity of the photoreceptor, up or down, as required by a particular application. As a consequence of these variables, it is advantageous to prepare charge generators, and thereby photoreceptors with variations as required during the lifetime of a given printer or copier which allows for minimal variation in the photoreceptor manufacturing conditions and wherein the processes are substantially odorless and avoid the use of non-toxic substances, or substances that decompose into toxic components. These and other advantages are enabled, in embodiments, with the articles, apparatuses, and processes illustrated herein.

SUMMARY

Embodiments disclosed include a process for the preparation of a mixture of charge generator pigments comprising, for example, forming a chlorogallium phthalocyanine (ClGaPc) in N-methyl-2-pyrrolidone (NMP) to obtain a ClGaPc (NMP) Type I product;

dry milling and then wet treating the resulting Type I product to convert it to a more sensitive corresponding Type II polymorph;

blending the resulting Type II product with hydroxygallium phthalocyanine Type V, a resin and a solvent for the resin to form a coating mixture; and coating the mixture to form a charge generator layer in an electrostatographic imaging article; an electrostatographic imaging article comprising a substrate;

a charge generator layer prepared as illustrated herein overcoated on the substrate; and a charge transport layer overcoated on the charge generator; and an imaging apparatus incorporating the photoconductive member illustrated herein.

EMBODIMENTS

There is disclosed a process comprising forming chlorogallium phthalocyanine (ClGaPc) in N-methyl-2-pyrrolidinone (NMP) to provide a ClGaPc (NMP);

separately dry milling and then wet treating to form Type II ClGaPc (NMP);

blending the ClGaPc Type II product with hydroxygallium phthalocyanine (HOGaPc) Type V and a resin to form a coating mixture; and coating the resulting mixture to form a photoconductive charge generator layer; a process comprising the mixing of a chlorogallium phthalocyanine (ClGaPc) in N-methyl-2-pyrrolidinone with hydroxygallium phthalocyanine Type V and a resin; a process comprising the dry milling and then wet treating of Type I chlorogallium phthalocyanine to form a ClGaPc (NMP) Type II product; blending a resin and the resulting Type II product with a second photogenerator compound having a photosensitivity of at least about 50 percent higher than the ClGaPc (NMP) Type II product in a resin to form a coating mixture; and coating the mixture on a substrate; a process wherein the coating mixture contains of from about 20 to about 80 weight percent of a mixture of ClGaPc Type II and a second photogenerator compound, and 80 to 20 weight percent resin, and wherein the second photogenerator compound is selected from the group consisting of titanyl phthalocyanines, metal-free phthalocyanines, alkoxygallium phthalocyanines, hydroxaygallium phthalocyanines, and mixtures thereof; and a photoconductive imaging member comprising a substrate;

a charge generator layer; and a charge transport layer and wherein the generator is prepared by the blending processes illustrated herein; a process comprising forming a first chlorogallium phthalocyanine (ClGaPc) in a N-methyl-2-pyrrolidinone (NMP) solvent to form a ClGaPc (NMP) mixture;

separately dry milling and then wet treating the Type I product obtained to form the corresponding Type II product;

blending or mixing the Type II product with a hydroxygallium phthalocyanine (HOGaPc) Type V, and a resin; and coating the mixture to form a photoconductive charge generator layer wherein charge generator layer can contain, for example, from about 20 to about 80 weight percent of combined hydroxygallium phthalocyanine Type V, and chlorogallium phthalocyanine Type II product, and from about 80 to about 20 weight percent resin, and the neat pigment mixture (excluding the resin), the weight ratio of ClGaPc Type II and HOGaPc Type V can vary from 90:10 to 10:90. In embodiments the total weight of pigment in the mixture can be, for example, from about 30 to about 70 weight percent, and about 70 to about 30 weight percent binder resin; the coating mixture can contain from about 5 to about 55 weight percent ClGaPc Type II product, from about 55 to about 5 weight percent of HOGaPc Type V, and from about 40 to about 60 weight percent of a resin or resins, and wherein the coating mixture can provide, for example, a photoconductive imaging member having an $E_{7/8}$ sensitivity, measured as 87.5 percent discharge, from about 3.1 to 6.0 ergs/cm². In embodiments, the above mentioned coating mixture can contain, for example, from about 25 to about 30 weight percent ClGaPc (NMP) Type II product, from about 25 to about 30 weight percent of hydroxygallium phthalocyanine Type V, and from about 40 to about 50 weight percent of a resin and provide a photoconductive imaging member with an $E_{7/8}$ sensitivity of about 5 ergs/cm².

Further disclosed is a process wherein there is avoided the use of toxic and odor producing materials, such as the solvent dimethyl sulfoxide, by, for example, selecting the appropriate ratio of ClGaPc in a NMP solvent, and mixing with hydroxygallium phthalocyanine HOGaPc Type V thereby generating a desirable photosensitivity value for the resulting blend, and wherein the photosensitivity may be manipulated or adjusted to provide a range of intermediate photosensitivity values, or tunable values, that is values that can be preselected; an imaging member containing ClGaPc and hydroxygallium phthalocyanines and wherein the photosensitivity thereof can be manipulated or modified by the particular solvent selected and used in the synthesis of the initial phthalocyanine material the Type I polymorph precursor. For example, preparing a ClGaPc Type I compound synthesized from gallium trichloride and 1,3- diiminoisoindoline in the solvent N-methyl-2-pyrrolidinone (NMP), also known as N-methylpyrrolidone, followed by dry milling and final wet treatment, affords a product designated as ClGaPc (NMP) Type II pigment. This product possesses, for example, high charge acceptance, low dark decay, excellent cycling characteristics and a high surface area or high BET, and may readily be formulated into a charge generator layer (CGL) dispersion.

The blending of mixtures of the HOGaPc Type V pigment and ClGaPc Type II pigment products can be accomplished by a variety of methods. One method comprises mixing the ClGaPc Type II with a HOGaPc Type V in a solution of suitable binder resin and solvent to form a pigment dispersion. The dispersion thus formed is then used to coat a charge generator layer in photoresponsive member. Alternatively, the resinous dispersions of ClGaPc and HOGaPc pigment are separately prepared and the blending is done by mixing these dispersions to form a final dispersion suitable for coating the generator layer.

In the industrial manufacture of charge generator compounds for the xerographic arts, there can be performed several large batch syntheses, for example annually, to prepare a stockpile of a target charge generator compound material. The stockpile provides a sufficient quantity of the charge generator compound to meet the quantity demands and specifications of a particular printer or copier model and its respective photoreceptor or photoreceptor(s) imaging components, and especially for printer or copier models in customer field use or the so-called market. Problems with this scheme include, for example, changes in model use or photoreceptor demand; changes in photoreceptor charge generator specifications; or a need to adjust the sensitivity of the photoreceptor, up or down, for example, as required by a particular application, machine or developer design change, or customer requirement. These problems can lead to, for example, excess or scrap charge generator compounds, or alternatively, charge generator compounds which are unacceptable or inadequate for formulation into a photoreceptor member primarily because of improper photosensitivity properties.

The resin or resins used in formulating the coating mixture can be, for example, poly(vinyl butyral), poly(vinyl carbazole), polyesters, polycarbonates, polyacrylates, polyacrylics, polymers or copolymers of vinyl chloride and vinyl acetate, vinylchloride-vinylacetate-maleic acid terpolymers, polystyrene, and combinations or mixtures thereof. Other suitable resins can include, for example, phenoxy resins, polyurethanes, poly(vinyl alcohol), polyacrylonitrile, and the like, polymers or copolymers, and mixtures thereof. Copolymers, block copolymers, terpolymers, block terpolymers, and the like polymeric materials and mixtures thereof can be used as the binding resin. The compounding weight ratio of the charge generator material to the binder resin is preferably from about 80:20 to about 20:80, and more preferably from about 60:40 to about 40:60. The aforementioned desired ratio is largely determined by the required photosensitivity value and other processing conditions. Coating processes and methods include but are not limited to, for example, blade coating, wire bar coating, spray coating, dip coating, bead coating, and curtain coating.

The dry milling can be accomplished, for example, with a vibration-type mill, and the wet treating can be accomplished, for example, with a ball mill. Thus, in embodiments the process comprises blending a chlorogallium phthalocyanine Type II and a hydroxygallium phthalocyanine Type V pigment, which hydroxygallium possesses a 50 percent higher photosensitivity than the chlorogallium phthalocyanine, in a resin and a solvent to form a coating mixture; and coating the mixture to form a charge generator layer in a photoresponsive imaging article; or wherein the coating mixture can contain, for example, from about 20 to about 80 weight percent of pigments, and which weight percent is based on the combined weight of the charge generator pigments and the resin. In embodiments, the present invention can also provide a photoresponsive imaging article comprising a substrate;

a charge generator layer prepared in accordance with the above mentioned preparative processes and which layer is overcoated on the substrate; and a charge transport layer overcoated on the charge generator, and optionally a protective overcoat or optionally an anticurl back coating layer.

In embodiments the present invention provides an imaging apparatus comprising: a known photoresponsive imaging apparatus which includes the above mentioned imaging member or article prepared in accordance with the processes of the present invention, for example, a photoresponsive imaging article comprising: a substrate; a charge generator layer prepared by the process of forming a first chlorogallium phthalocyanine (ClGaPc) in N-methyl-2-pyrrolidone (NMP) to form a ClGaPc (NMP) Type I product; dry milling and then wet treating the resulting Type I products to convert the chlorogallium phthalocyanine to a more sensitive Type II polymorph; blending the resulting Type II product with a hydroxygallium phthalocyanine (HOGaPc) Type V in a resin and a solvent for the resin to form a coating mixture; and coating the mixture to form a charge generator layer overcoated on the substrate; and a charge transport layer overcoated on the charge generator;

a photoresponsive imaging member comprising a support, and at least one photoconductive layer comprising photoconductive particles, wherein the photoconductive particles in the photoconductive layer are comprised of a mixture of ClGaPc Type II pigment particles and hydroxygallium phthalocyanine Type V, wherein (i) from about 90 percent to about 10 percent by weight of the ClGaPc Type II pigment particles are obtained from a synthesis of ClGaPc in NMP solvent; and (ii) from about 10 percent to about 90 percent by weight of the hydroxygallium phthalocyanine Type V; a photoresponsive imaging member comprising a support; a charge generating layer having a binder; a mixture of ClGaPc pigment particles and hydroxygallium phthalocyanine; and a charge transport layer.

The charge generator layer can contain, for example, from about 20 to about 80 weight percent of combined hydroxygallium phthalocyanine Type V, and chlorogallium phthalocyanine Type II product, and from about 80 to about 20 weight percent resin. Within the neat pigment mixture (excluding the resin), the weight ratio of ClGaPc Type II and HOGaPc Type V can vary from 90:10 to 10:90. In an embodiment the article can possess, for example, a charge generator layer which contains the individual components, for example, from about 2 to about 72 weight percent ClGaPc Type II from about 72 to about 2 weight percent hydroxygallium phthalocyanine Type V, and from about 20 to about 80 weight percent resin or resin mixture, while keeping the sum of all three components at 100 weight percent. The preferred range of ClGaPc Type II is from about 14 to about 42 weight percent, more specifically the range of HOGaPc Type V is from about 14 to about 42 weight percent, and more specificially the range of resin is from about 40 to about 60 weight percent. The charge generator layer preferably has a thickness of from, for example, from about 0.1 to about 5 micrometers, and more specifically, the thickness is from about 0.2 to about 2 microns.

The imaging article in embodiments can possess, for example, an $E_{1/2}$ photosensitivity of from about 1.5 to about 2.5 and an $E_{7/8}$ photosensitivity of from about 3.3 to about 5.9 ergs/cm. Specific ranges of charge generator layer composition can have, for example, from about 25 to about 30 weight percent ClGaPc Type II product, from about 25 to about 30 weight percent of hydroxygallium phthalocyanine Type V, and from about 40 to about 50 weight percent of a resin, and provide a photoconductive imaging member with an $E_{7/8}$ sensitivity of about 4 to about 5.5 ergs/cm$^2$.

The imaging member or article can include a substrate, for example, an endless photoconductive member, such as a drum, belt, or drelt (belt mounted on drum) having an inner layer, a charge retentive outer layer, and a conductive electrode layer between the inner and outer layers. In embodiments the imaging process and apparatus can include depositing charged marking particles on an outer surface of the photoconductive member and held in relative contact therewith; a light source for selectively exposing the photoconductive member to light to produce both exposed and unexposed regions therein and to cause the collapse of the electric field in the exposed regions; and an image receiver member, spaced apart from the outer surface of the photoconductive member, for receiving the marking particles, the image receiving member having an electrical bias applied thereto to neutralize an electric field present in the gap between the image receiver member and the exposed regions of the photoconductive member.

The chlorogallium phthalocyanine Type I used as a starting material to prepare. The ClGaPc Type II pigment products in the present invention can be produced, for example, by reacting gallium trichloride with heating in an organic solvent, such as NMP. The resulting chlorogallium phthalocyanine Type I products have x-ray diffraction (under Cu Kα radiation) peaks at Bragg angles (2θ+/−0.2°), at least at 9.3°, 10.9°, 13.3°, 18.7°, 20.3°, 26.9°, 28.9° and 33.1° with the largest peak at 26.9°. Chlorogallium phthalocyanine obtained by these synthetic processes can be mechanically dry-ground according to the present invention. Using a grinder for fine grinding by incorporating grinding media in the interior of the grinding vessel, such as a vibration mill, a planetary ball mill, a sand mill, an attritor, a ball mill, and the like devices, the chlorogallium phthalocyanine product is preferably dry-ground with a weight ratio or parts ratio of chlorogallium phthalocyanine pigment to grinding media in a range of, for example, from about 1:5 to about 1:100. The time period of pulverization can be, for example, from about 1 to about 300 hours, and where crystal conversion occurs and obtains the intended chlorogallium phthalocyanine crystal of low crystallinity and designated as Type IIA. Type IIA exhibited broad peaks at Bragg angles (2θ+/−0.2°) at 7.3°, 16.5°, 25.4° and 28.1°. Estimated crystallite size is 170 Angstroms.

A vibration mill can provide a high grind efficiency. As the raw material for the grinding media, any known materials such as glass, alumina, zirconia, steel, stainless steel, carbon steel, chromium steel, silicon nitride, nylon, and polyurethane can be used. The shape of the grinding media, which can be used, can be a known shape, such as a spherical, circular or disc, globular, rod, or cylindrical form. The weight ratio or parts ratio of chlorogallium phthalocyanine to the grinding media can be from about 1:5 to about 1:100, and more specifically from about 1:5 to about 1:20. If the weight ratio of chlorogallium phthalocyanine to the grinding media is greater than about 1:5, the grinding efficiency is decreased and requires a much longer grind period, and thus is not preferred for high production efficiency. Moreover, even when the grind period is extended, the fine grind apparently will not generate any additional particle size reduction and does not provide any improvement in sensitivity. Conversely, if the weight ratio is less than about 1:100, the recovery of the crystal-converted chlorogallium phthalocyanine is decreased, and importantly, wearing of the grinding media is increased, which wear can contaminate the ClGaPc product and can cause the resulting image quality of printed materials to be adversely affected. The converted chlorogallium phthalocyanine Type IIA crystal more specifically has an average particle size of not more than about 0.20 micrometer, and particularly from about 0.01 to about 0.20 micrometer, and can be achieved by adjusting the grinding period. The chlorogallium phthalocyanine which has been converted to Type IIA by the process of the present invention has a broad main diffraction peak at least at 7.3°, 16.5°, 25.4° and 28.1°. The low crystallinity ClGaPc pigment can be further crystallized to a higher crystallinity form, designated as Type II, by a wet treatment process in which the pigment is milled in a solvent, such as dimethylsulfoxide, using glass beads, and a mill, such as a roll mill. The chlorogallium phthalocyanine Type II product modified by the process of the present invention has higher crystallinity with main diffraction peaks at least at 7.2°, 16.5°, 21.6°, 23.5°, 25.3°, 28.1°, 29.6° and 38.5°. Estimated crystallite size is 270 Angstroms which is much higher than the Type IIA.

The film thickness of the charge generating layer is preferably from about 0.1 to about 5 micrometers, and more specifically from about 0.2 to about 2 micrometers. The charge generating layer can be overcoated with a charge transport layer and can be composed of any suitable charge transport material and any suitable film-forming resin. Examples of suitable film-forming resin or resins include, but are not limited to, polyarylates, polycarbonates, polyallylates, polystyrenes, polyesters, styrene-acrylonitrile copolymers, polysulfones, polymethacrylates, styrene-methacrylate copolymers, polyolefins, and the like materials. Of these, polycarbonates are particularly suitable in terms of durability. The compounding weight ratio of the charge transport material to the film-forming resin is more specifically from about 5:1 to about 1:5, and yet more specifically, from about 3:1 to about 1:3. If the ratio of the charge material is too high, the mechanical strength of the charge transport layer is decreased and, conversely, if it is too low, sensitivity of the device is lowered.

The charge transport material layer can be formed by dissolving the charge transport material and the film-forming resin in an appropriate solvent, followed by coating application. More specifically, the charge transport layer can be formed in such a manner that the film thickness is of from about 5 to about 50 micrometers, and more specifically from about 10 to about 40 micrometers. Methods for applying the charge transport layer include the above mentioned methods for applying the charge generator layer.

If the photosensitive layer has a single layer construction, the photogenerator material can be described as the mixture of chlorogallium phthalocyanine and hydroxygallium phthalocyanine pigments, and the single layer also contains charge transport material dissolved in the film forming resin or resins component. Any suitable charge transport material can be used and the film forming resin can be the same or similar material to those mentioned above. The single photosensitive layer can be formed by any of the above-mentioned coating methods. It is preferable to set the compounding weight ratio of the charge transport material to the film forming resin at the range of from about 20:80 to about 80:20, and the compounding weight ratio of the photogenerator material (mixture of chlorogallium phthalocyanine plus hydroxygallium phthalocyanine) to the charge transport material at the range of from about 5:95 to about 30:70.

An undercoat layer can optionally be provided between the photosensitive layer and the substrate. The undercoat layer is effective for preventing the injection of unnecessary electric charge from the substrate, and has a function of enhancing charging properties. Also, it has a function of enhancing the adhesion between the photosensitive layer and the substrate.

Examples of substrate layers selected for the imaging members of the present invention can be opaque or substantially transparent, and may comprise any suitable material having the requisite mechanical properties. Thus, the substrate may comprise a layer of insulating material including inorganic or organic polymeric materials, such as MYLAR® a commercially available polymer, MYLAR® containing titanium, a layer of an organic or inorganic material having a semiconductive surface layer, such as indium tin oxide, or aluminum arranged thereon, or a conductive material inclusive of aluminum, chromium, nickel, brass or the like. The substrate may be flexible, seamless, or rigid, and many have a number of many different configurations, such as for example a plate, a cylindrical drum, a scroll, an endless flexible belt, and the like. In one embodiment, the substrate is in the form of a seamless flexible belt. In some situations, it may be desirable to coat on the back of the substrate, particularly when the substrate is a flexible organic polymeric material, an anticurl layer, such as for example polycarbonate materials commercially available as MAKROLON®.

The thickness of the substrate layer depends on many factors, including economical considerations, thus this layer may be of substantial thickness, for example over 3,000 microns, or of minimum thickness providing there are no adverse effects on the system. In one embodiment, the thickness of this layer is from about 75 microns to about 300 microns.

Aryl amines selected for the hole transporting layers, which generally are of a thickness of from about 5 microns to about 75 microns, and preferably of a thickness of from about 10 microns to about 40 microns, include molecules of the following formula

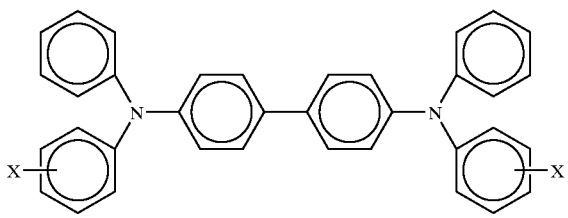

dispersed in a highly insulating and transparent polymer binder, wherein X is an alkyl group, a halogen, or mixtures thereof, especially those substituents selected from the group consisting of Cl and $CH_3$.

Examples of specific aryl amines are N,N'-diphenyl-N, N'-bis(alkylphenyl)-1,1-biphenyl-4,4'-diamine wherein alkyl is selected from the group consisting of methyl, ethyl, propyl, butyl, hexyl, and the like; and N,N'-diphenyl-N,N'-bis(halophenyl)-1,1'-biphenyl4,4'-diamine wherein the halo substituent is preferably a chloro substituent. Other known charge transport layer molecules can be selected, reference for example U.S. Pat. Nos. 4,921,773 and 4,464,450, the disclosures of which are totally incorporated herein by reference.

Examples of the highly insulating and transparent polymer binder material for the transport layers include components, such as those described in U.S. Pat. No. 3,121,006, the disclosure of which is totally incorporated herein by reference. Specific examples of polymer binder materials include polycarbonates, acrylate polymers, vinyl polymers, cellulose polymers, polyesters, polysiloxanes, polyamides, polyurethanes and epoxies as well as block, random or alternating copolymers thereof. Preferred electrically inactive binders are comprised of polycarbonate resins having a molecular weight of from about 20,000 to about 100,000 with a molecular weight of from about 50,000 to about 100,000 being particularly preferred. Generally, the transport layer contains from about 10 to about 75 percent by weight of the charge transport material, and more specifically, from about 35 percent to about 50 percent of this material. Charge transport, especially hole transports other than those specifically disclosed herein, may also be selected.

In addition, to improve photoreceptor wear resistance, a protective overcoat layer can be provided on the photosensitive layer, or the transport layer as appropriate for the particular device configuration. Suitable overcoat materials include those resins described above. Further improvement in wear properties can be made by adding wear-resistant fillers which can be added to the overcoat layer. Fillers include fine particle materials; polymeric particles, such as TEFLON® balls, metal and non-metal oxides such as silica, silicon nitride, tin oxide, titanium oxide, aluminum oxide, cerium oxide, and the like.

The mixture of hydroxygallium phthalocyanine and chlorogallium phthalocyanine crystals obtained by the process of the present invention can provide an electrophotographic photoreceptor exhibiting excellent photosensitivity, excellent electrophotographic characteristics, and excellent dispersability, and having excellent-image quality without fogging and black spots by incorporating the crystals into a photosensitive layer as a charge generator material. Furthermore, the photogenerator layer matrix and the crystals may be mixed in any ratio desired without any negative consequences. The mixed crystal system composition may be chosen as required to attain any desired level of photosensitivity within the range defined by the respective ClGaPc and HOGaPc pigment products when formulated into a photoreceptor device alone.

The resulting photoreceptors can be effectively used in an electrophotographic copying machine, and it is also applicable to, for example, laser beam printers, LED printers, CRT printers, microfilm readers, plain paper facsimiles, and the like electrophotographic printing systems.

The following Examples are being submitted to illustrate embodiments of the present invention. These Examples are intended to be illustrative only and are not intended to limit the scope of the present invention. Temperatures are in degrees Centigrade, and percentages are by weight.

EXAMPLE I

Preparation of Chlorogallium Phthalocyanine in NMP (ClGaPc Type I)

In a 2 liter round bottomed flask, 20 parts of N-methyl-2-pyrrolidinone (NMP), 4 parts of 1,3-diiminoisoindoline and 1 part of gallium trichloride were mixed. The mixture was reacted at 200° C. for 5 hours under a nitrogen atmosphere. Thereafter, the product was filtered off, washed 3 times with 10 parts of N,N-dimethylformamide (DMF) and then 3 times with 10 parts of deionized water, and then the wet cake obtained was dried to obtain 2.2 parts of chlorogallium phthalocyanine. The powder X-ray diffraction identified the resulting product as chlorogallium phthalocyanine Type I when compared to known standards having peaks at least at 9.3°, 10.9°, 13.3°, 18.7°, 20.3°, 26.9°, 28.9° and 33.1° of the Bragg angle relative to Cu—K alpha character X-ray (2 theta+/−0.2°), with the largest peak at 26.9°.

EXAMPLE II

Preparation of Chlorogallium Phthalocyanine Type IIA (ClGaPc Type IIA)

To a 500 milliliter polypropylene bottle containing 500 grams of ½ inch cylindrical alumina media were added 50 grams of the Type I polymorph ClGaPc obtained in Example I above. The bottle was then placed on a vibration mill and agitated for 14 days, after which time the ClGaPc was isolated and determined to be the low crystallinity Type IIA polymorph by powder X-ray diffraction having broad peaks primarily at 7.3°, 16.5°, 25.4° and 28.1° of the Bragg angle relative to Cu—K alpha character X-ray (2 theta+/−0.2°).

EXAMPLE III

Preparation of Chlorogallium Phthalocyanine Type II (ClGaPc Type II)

To a 120 milliliter glass bottle containing 60 grams of ¼ inch glass beads were added 3 grams of the Type IIA ClGaPc obtained in Example II above and 35 grams of DMSO. The bottle was then placed on a roll mill for a period of approximately 24 hours, after which time the resulting form of ClGaPc was isolated by filtration. The ClGaPc was then washed with water and dried to deliver about 2.7 grams of the high crystallinity Type II polymorph characterized by having peaks at least at 7.2°, 16.5°, 21.6°, 23.5°, 25.3°, 28.1°, 29.6° and 38.5° of the Bragg angle relative to Cu—K alpha character X-ray (2 theta+/−0.2°), with the largest peak at 28.1°. The average particle size of the chlorogallium phthalocyanine pigment particles determined by transmission electron microscopy was about 25 to about 50 nanometers.

EXAMPLE IV

Alkoxy-bridged Gallium Phthalocanine Dimer Synthesis

To a 1 liter round bottomed flask were added 25 grams of $GaCl_3$ and 300 milliliters of toluene, and the mixture was stirred for 10 minutes to form a solution. Then, 98 milliliters of a 25 weight percent sodium methoxide solution (in methanol) were added while cooling the flask with an ice bath to keep the contents below 40° C. Subsequently, 250 milliliters of ethylene glycol and 72.8 grams of o-phthalodinitrile were added. The methanol and toluene were quickly distilled off over 30 minutes while heating from 70° C. to 135° C., and then the phthalocyanine synthesis was performed by heating at 195° C. for 2 hours. The alkoxy-bridged gallium phthalocyanine dimer was isolated by filtration at 120° C. The product was then washed with 400 milliliters of DMF at 100° C. for 1 hour and filtered; then washed with 400 milliliters of deionized water at 80° C. for 1 hour and filtered, and the product was then washed with 400 milliliters of methanol at 60° C. for 1 hour and filtered. The product was dried at 60° C. under vacuum for 18 hours. The alkoxy-bridged gallium phthalocyanine dimer, 1,2-di (oxogallium phthalocyaninyl) ethane, was isolated as a dark blue solid in 80 percent yield. The dimer product was characterized by X-ray powder diffraction pattern peaks at Bragg angles (2 theta+−0.2 degree) of 6.7, 8.9, 12.8, 13.9, 15.7, 16.6, 21.2, 25.3, 25.9, and 28.3, with the highest peak at 6.7 degrees 2 theta.

EXAMPLE V

Hydrolysis of Alkoxy-bridged Gallium Phthalocyanine Dimer to Hydroxygallium Phthalocyanine Type I The alkoxy-bridged gallium phthalocyanine dimer prepared as described in Example IV was hydrolyzed as follows. Sulfuric acid (about 94 to about 96 percent, 125 grams) was heated to 40° C. in a 125 milliliter Erlenmeyer flask and then 5 grams of the alkoxy-bridged gallium phthalocyanine dimer were added, while stirring, over approximately 15 minutes, during which time the temperature of the solution increased to about 48° C. The acid solution was then stirred for 2 hours at 40° C., after which it was added in a dropwise fashion to a mixture comprised of concentrated (about 30 percent) ammonium hydroxide (265 milliliters) and deionized water (435 milliliters), which had been cooled to a temperature below 5° C. The addition of the dissolved dimer pigment was completed in about 30 minutes, during which time the temperature of the solution increased to about 40° C. The reprecipitated pigment was then removed from the cooling bath and allowed to stir at room temperature, about 22° C. to 25° C., for 1 hour. The pigment was then filtered through a porcelain funnel fitted with a Whatman 934-AH grade glass fiber filter. The resulting blue pigment was redispersed in fresh deionized water by stirring at room temperature for 1 hour and filtered as above. This process was repeated at least three times until the conductivity of the filtrate was <20 micros. The resulting filter cake was then oven dried overnight, about 18 to about 20 hours, at 50° C. to provide 4.4 grams (88 percent) of HOGaPc Type I identified by X-ray powder diffraction and having peaks at Bragg angles of 6.8, 13.0, 16.5, 21.0, 26.3 and 29.5, with the highest peak at 6.8 degrees (+−0.2 degree).

EXAMPLE VI

Conversion to Hydroxygallium Phthalocyanine Tape V

The hydroxygallium phthalocyanine Type I pigment obtained in Example V above was converted to HOGaPc Type V as follows. The pigment (3 grams) was added to 45 milliliters of N,N-dimethylformamide in a 120 milliliter glass bottle containing 90 grams of glass beads (0.25 inch in diameter). The bottle was then sealed and placed on a ball mill for 24 hours. The solid resulting was isolated by filtration through a porcelain funnel fitted with a Whatman GF/F grade glass fiber filter, and washed in the filter using several 50 milliliter portions of butyl acetate. The resulting filter cake was oven dried overnight at 50° C. to provide 2.8 grams of Type V HOGaPc which was identified by X-ray powder diffraction having peaks at Bragg angles of 7.4, 9.8, 12.4, 12.9, 16.2, 18.4, 21.9, 23.9, 25.0 and 28.1, with the highest peak at 7.4 degrees (+−0.2 degree).

EXAMPLE VII

Preparation of a Photoresponsive Device Containing Chlorogallium Phthalocyanine, Tape II Pigment A photoresponsive member incorporating a ClGaPc Type II pigment was prepared in accordance with the following procedure. A ClGaPc dispersion was prepared by ball milling 0.2 gram of ClGaPc Type II pigment (obtained in Example III), 0.159 gram of vinylchloride-vinylacetate-maleic acid terpolymer, 4.72 grams of p-xylene and 2.33 grams of n-butyl acetate in a 30 milliliter bottle containing 70 grams of ⅛ inch stainless steel balls. The bottle was put on a roll mill and milled for 1 day. The resulting ClGaPc dispersion was coated onto an aluminized MYLAR® film, which was previously coated with a 0.1 micrometer silane layer using a wire roll. The coated device was dried at 100° C. for 10 minutes. The optical density of the dry ClGaPc charge generator layer was about 1 at a wavelength of 780 nanometers. A charge transport solution was prepared by dissolving 2.7 grams of N,N-diphenyl-N,N'-bis(3-methyl phenyl)-1,1'-biphenyl-4,4'-diamine, and 4.05 grams of polycarbonate in 30.8 grams of monochlorobenzene. The solution was coated onto the above ClGaPc generator layer using a 7 mil film applicator. The charge transporting layer thus obtained was dried at 115° C. for 60 minutes to provide a final thickness of about 17 micrometers.

EXAMPLE VIII

Preparation of a Photoresponsive Device Containing Hydroxygallium Phthalocyanine Type V Pigment An photoresponsive device was prepared as in Example VII with the exception that the charge generating pigment contained 0.2 gram of the HOGaPc Type V pigment obtained in Example VI.

EXAMPLE IX

Preparation of Photoresponsive Devices Containing a Mixture of Chlorogallium Phthalocyanine, Type II and Hydroxygallium Phthalocyanine, Type V Three photoresponsive members were fabricated as in Example VII with the exception that the charge generating material was now substituted with a mixture of two pigments selected from Example III and Example VI. The compositions of pigment mixtures in these devices are listed below (Table 1).

TABLE 1

Photoresponsive Members Containing a Mixture of ClGaPc and HOGaPc

| Device I.D. | Composition of Charge Generating Material |
| --- | --- |
| IX a | 0.15 gram ClGaPC (Example III) + 0.05 gram HOGaPC (Example VI) |
| IX b | 0.10 gram ClGaPc (Example III) + 0.10 gram HOGaPC (Example VI) |
| IX c | 0.05 gram ClGaPc (Example III) + 0.15 gram HOGaPc (Example VI) |

This provided photoresponsive members with varying blend ratios of the constituent ClGaPc and HOGaPc ranging from 3:1 to 1:3.

Evaluation of Photoresponsive Members

The xerographic electrical properties of photoresponsive members of Examples VII, VIII, and IX were determined by known means, including as indicated herein electrostatically charging the surfaces thereof with a corona discharge source until the surface potentials, as measured by a capacitively coupled probe attached to an electrometer, attained an initial value $V_0$ of about −500 volts. After resting for a 0.5 second in the dark, the charged members attained a surface potential of $V_{ddp}$, dark development potential. The photoconductive imaging members were then exposed to light from a filtered Xenon lamp with a 150 watt bulb, thereby inducing a photodischarge which resulted in a reduction of surface potential to a $V_{bg}$ value, background potential. The wavelength of the incident light was 780 nanometers, and the exposure energy of the incident light varied from 0 to 15 ergs/cm². The dark decay (D.D.) value was calculated according to the equation, $D.D.=2\times(V_0-V_{ddp})$. By plotting the surface potential against exposure energy, a photodischarge curve was constructed. The photosensitivity of the imaging member can be described in terms of $E_{1/2}$, that is the amount of exposure energy in erg/cm² required to achieve 50 percent photodischarge from the dark development potential. The photosensitivity of the imaging member can also be described in terms of $E_{7/8}$, that is the amount of exposure energy in erg/cm² required to achieve about 88 percent photodischarge from the dark development potential.

Table 2 summarizes the xerographic electricals of photoresponsive devices of some of the above Examples.

TABLE 2

Xerographic Electricals of Photoresponsive Devices

| Device I.D. | Charge Generator Material | Dark Decay V/s | $E_{1/2}$, erg/cm² | $E_{7/8}$, erg/cm² |
| --- | --- | --- | --- | --- |
| Example VII | ClGaPc | 12 | 2.63 | 6.06 |
| Example VIII | HOGaPc | 11 | 1.45 | 3.11 |
| Example IXa | 3:1 of ClGaPc : HOGaPc | 8.5 | 2.45 | 5.84 |
| Example IXb | 1:1 of ClGaPc : HOGaPc | 11 | 2.01 | 4.65 |
| Example IXc | 1:3 of ClGaPc : HOGaPc | 10 | 1.68 | 3.61 |

Table 2 also illustrates, for example, a comparison of photoreceptor devices prepared using blended pigment products with those devices prepared using the constituent pigment materials alone. It is readily apparent that a range of intermediate sensitivities can be obtained. Furthermore, it should be noted that the photosensitivity exhibits an excellent linear dependence relationship with the composition of pigment in the generator layer. A plot of $E_{1/2}$ values versus the weight percent of ClGaPc relative to HOGaPc has a linear regression value $R^2$ of 0.964, and $E_{7/8}$ has a value $R^2$ of 0.985. Both $R^2$ values approach the thereotical limit of unity indicating the high reliability of interpolating photosensitivity from the composition. The estimation of final sensitivity value of any pigment mixture is readily calculable, making the manufacturing process easy to control. The use of mixture of these pigments allows one to make photoreceptors with different photosensitivity values while eliminating the costly approach to develop an individual pigment targeted for each specific photoreceptor product.

Other embodiments and modifications of the present invention may occur to those skilled in the art subsequent to a review of the information presented herein; these embodiments and modifications, equivalents thereof, substantial equivalents thereof, or similar equivalents thereof are also included within the scope of this invention.

What is claimed is:

1. A process comprising forming chlorogallium phthalocyanine (ClGaPc) in N-methyl-2-pyrrolidinone (NMP) to provide a ClGaPc (NMP) Type I; separately dry milling and then wet treating the Type I product to form Type II ClGaPc (NMP); blending the ClGaPc Type II product with hydroxygallium phthalocyanine (HOGaPc) Type V and a resin to form a coating mixture; and coating the resulting mixture to form a photoconductive charge generator layer.

2. A process comprising the mixing of a chlorogallium phthalocyanine (ClGaPc) Type II prepared in N-methyl-2-pyrrolidinone with hydroxygallium phthalocyanine Type V and a resin.

3. A process in accordance with claim 1 wherein the coating mixture contains from about 10 to about 60 weight percent of ClGaPc (NMP) Type II, from about 60 to about 10 weight percent of hydroxygallium phthalocyanine Type V and from about 30 to about 70 weight percent resin, and coating this mixture to form a photoconductive charge generator layer.

4. A process in accordance with claim 1 wherein the coating mixture contains from about 20 to about 40 weight percent ClGaPc (NMP) Type II, from about 40 to about 20 weight percent of hydroxygallium phthalocyanine Type V, and from about 40 to about 60 weight percent of a resin.

5. A process in accordance with claim 1 wherein the coating mixture contains from about 20 to about 40 weight percent ClGaPc (NMP) Type II, which Type II is generated by the milling of Type I, from about 40 to about 20 weight percent of hydroxygallium phthalocyanine Type V, and from about 40 to about 60 weight percent of a resin.

6. A process in accordance with claim 5 wherein the coating mixture contains from about 25 to about 30 weight percent ClGaPc (NMP) Type II, from about 25 to about 30 weight percent of hydroxygallium phthalocyanine Type V, and from about 40 to about 50 weight percent of a resin.

7. A process in accordance with claim 1 wherein the resulting charge generator layer possesses a $E_{7/8}$ photosensitivity measured at about 87 percent discharge of from about 3.3 to about 5.9 ergs/cm².

8. A process in accordance with claim 1 wherein the resin is poly(vinyl butyral), poly(vinyl carbazole), polyesters, polycarbonates, polyacrylates, polyacrylics, polymers or copolymers of vinyl chloride and vinyl acetate, vinylchloride-vinylacetate-maleic acid terpolymers, polystyrene, or mixtures thereof.

9. A process in accordance with claim 1 wherein the chlorogallium phthalocyanine is converted to chlorogallium phthalocyanine Type II by dry milling with a vibration-type mill, and wherein said treating is accomplished with a ball mill in a solvent.

10. A process in accordance with claim 1 comprising dry milling and then wet treating Type I chlorogallium phthalocyanine product to form a ClGaPc (NMP) Type II product; blending a resin and the resulting Type II product with a second photogenerator compound having a photosensitivity of at least about 50 percent higher than the ClGaPc (NMP) Type II product in a resin to form a coating mixture; and coating the mixture on a substrate.

11. A process in accordance with claim 10 wherein a coating mixture contains from about 30 to about 70 weight percent of a mixture of the ClGaPc Type II product and a second photogenerator compound based on the combined weight of the photogenerator compounds and the resin, and wherein the second photogenerator compound is selected from the group consisting of titanyl phthalocyanines, metal-free phthalocyanines, alkoxygallium phthalocyanines, hydroxygallium phthalocyanines, and mixtures thereof.

12. A process in accordance with claim 10 comprising forming a chlorogallium phthalocyanine in NMP to form ClGaPc (NMP) Type I product; dry milling and then wet treating the product to form a ClGaPc (NMP) Type II product; blending the resulting product with hydroxygallium phthalocyanine Type V, and a resin to form a coating mixture; and coating the mixture to form a charge generator layer in an electrostatographic imaging article.

13. A member comprising a substrate, a charge generator layer, and a charge transport layer, and wherein said generator is prepared by the process of claim 1.

14. A member in accordance with claim 13 wherein the member is a photoconductor possessing an $E_{1/2}$ photosensitivity of from about 1.5 to about 3, and an $E_{7/8}$ photosensitivity of from about 3.3 to about 5.9 ergs/cm².

15. A member in accordance with claim 13 wherein the charge generator layer contains from about 25 to about 30 weight percent ClGaPc (NMP) Type II product, from about 25 to about 30 weight percent of hydroxygallium phthalocyanine Type V, and from about 40 to about 60 weight percent of resin.

16. A member in accordance with claim 13 wherein the ClGaPc (NMP) Type II product has an average particle size diameter of from about 25 to about 50 nanometers.

17. A member in accordance with claim 13 wherein the ClGaPc (NMP) Type II product has a particle surface area of from about 40 to about 70 square meters per gram.

18. A member in accordance with claim 13 wherein the charge generator layer is from about 0.1 to about 0.5 micrometer thick.

19. An imaging apparatus comprising an article in accordance with claim 12.

20. A photogenerating mixture comprised of a chlorogallium phthalocyanine (ClGaPc), a hydroxygallium phthalocyanine Type V and a resin, and wherein said mixture is generated by the process of claim 1.

21. A mixture in accordance with claim 20 and comprised of a chlorogallium phthalocyanine Type II, a hydroxygallium phthalocyanine Type V, and a resin.

22. A mixture in accordance with claim 20 containing from about 25 to about 30 weight percent of Type II, from about 25 to about 30 weight percent of hydroxygallium phthalocyanine Type V, and from about 40 to 60 weight percent resin wherein the total thereof is about 100 percent.

23. A mixture in accordance with claim 20 containing from about 25 to about 30 weight percent of Type II, from about 25 to about 30 weight percent of hydroxygallium phthalocyanine Type V, and from about 50 to 60 weight percent resin wherein the total thereof is about 100.

24. A photoconductive imaging member comprised of a photogenerating layer and a charge transport layer, and wherein said photogenerating layer is prepared by a process comprising forming chlorogallium phthalocyanine (ClGaPc) in N-methyl-2-pyrrolidinone (NMP) to provide a ClGaPc (NMP) Type I; separately dry milling and then wet treating the Type I product to form Type II ClGaPc (NMP); blending the ClGaPc Type II product with hydroxygallium phthalocyanine (HOGaPc) Type V and a resin to form a coating mixture; and coating the resulting mixture to form a photoconductive charge generator layer.

* * * * *